US008782914B1

(12) United States Patent
DeLuca

(10) Patent No.: US 8,782,914 B1
(45) Date of Patent: Jul. 22, 2014

(54) SEGMENTED MEASURING ASSEMBLY AND METHOD OF USE

(76) Inventor: Gregory G. DeLuca, Norwood, MA (US)

(*) Notice: Subject to any disclaimer, the term of this patent is extended or adjusted under 35 U.S.C. 154(b) by 214 days.

(21) Appl. No.: 13/309,827

(22) Filed: Dec. 2, 2011

Related U.S. Application Data

(60) Provisional application No. 61/506,573, filed on Jul. 11, 2011, provisional application No. 61/468,055, filed on Mar. 27, 2011.

(51) Int. Cl.
*B43L 7/10* (2006.01)
*G01B 3/06* (2006.01)
*B43L 9/04* (2006.01)

(52) U.S. Cl.
USPC .............................. 33/458; 33/27.03; 33/471

(58) Field of Classification Search
USPC ............. 33/458, 27.03, 27.031, 27.032, 41.1, 33/41.4, 41.6, 42, 452, 456, 459, 465, 471, 33/478, 495–500
See application file for complete search history.

(56) References Cited

U.S. PATENT DOCUMENTS

| | | | | |
|---|---|---|---|---|
| 368,434 A | * | 8/1887 | Tiller | 33/392 |
| 594,607 A | | 11/1897 | Davis | |
| 700,023 A | * | 5/1902 | Duby | 33/42 |
| 756,594 A | * | 4/1904 | Davis | 33/498 |
| 765,300 A | * | 7/1904 | Williams | 33/27.03 |
| 893,035 A | * | 7/1908 | Turner | 33/458 |
| 940,439 A | * | 11/1909 | Dolph | 33/497 |
| 991,693 A | * | 5/1911 | Brown | 33/42 |
| 1,172,631 A | * | 2/1916 | Prout | 33/458 |
| 1,227,206 A | | 5/1917 | Schade | |
| 1,907,459 A | * | 5/1933 | Stowell | 403/101 |
| 1,965,230 A | | 7/1934 | Gasstrom | |
| 1,998,018 A | * | 4/1935 | Kadu | 33/452 |
| 2,470,035 A | * | 5/1949 | Hudkins | 33/418 |
| 2,515,622 A | * | 7/1950 | Wild | 33/497 |
| 2,629,179 A | | 2/1953 | Folke | |
| 2,633,641 A | | 4/1953 | Fleming | |
| 2,663,940 A | | 12/1953 | Gasstrom | |
| 2,741,030 A | | 4/1956 | Wise | |
| 2,775,037 A | * | 12/1956 | Baumunk | 33/499 |
| 2,842,850 A | * | 7/1958 | Anderson et al. | 33/458 |
| 3,490,148 A | * | 1/1970 | Mathes | 33/458 |
| 3,623,230 A | | 11/1971 | Quenot | |
| 3,934,351 A | | 1/1976 | Sullivan | |
| 4,194,295 A | | 3/1980 | Simuro | |
| 4,446,627 A | * | 5/1984 | Persson | 33/497 |
| 4,920,658 A | * | 5/1990 | Hile | 33/499 |
| 4,956,919 A | * | 9/1990 | Granger | 33/32.2 |

(Continued)

*Primary Examiner* — Christopher Fulton
(74) *Attorney, Agent, or Firm* — John Brooks Law LLC; John J Brooks, III

(57) ABSTRACT

A segmented measuring assembly and pivot connection system for the segmented measuring assembly. Embodiments of the measuring assembly comprise a first and second ruler section, each ruler section having a section length, a section width and a section thickness, each ruler section further comprising a section proximal end, a section distal end, and a pivot connection system connecting the distal end of the first ruler section and the proximal end of the second ruler section whereby the second ruler section pivots in relation to the first ruler section about a pivot connection assembly. In some embodiments, the ruler sections have a plurality of section through holes extending through the section thickness along the section length. In some embodiments, the ruler sections have curved ends whereby there is no overhang of the curved ends when the ruler sections pivot in relation to each other.

21 Claims, 10 Drawing Sheets

(56) References Cited

U.S. PATENT DOCUMENTS

| | | | |
|---|---|---|---|
| 5,020,233 A * | 6/1991 | Syken | 33/465 |
| D333,991 S | 3/1993 | Lee | |
| 5,509,212 A | 4/1996 | Henricksen | |
| D387,689 S | 12/1997 | Sharon | |
| 6,141,882 A * | 11/2000 | Syken | 33/471 |
| 6,260,283 B1 | 7/2001 | Abernathy | |
| 6,289,594 B1 * | 9/2001 | Wrobbel | 33/42 |
| 6,954,990 B2 | 10/2005 | Ellis | |
| 6,964,110 B2 | 11/2005 | Shapiro | |
| 7,047,655 B2 * | 5/2006 | Larsson | 33/471 |
| 7,171,757 B1 | 2/2007 | Stoneberg | |
| 7,278,221 B1 * | 10/2007 | Shapiro | 33/471 |
| 8,375,592 B1 * | 2/2013 | Holt | 33/456 |
| 2007/0271801 A1 | 11/2007 | Campagna | |
| 2010/0043243 A1 * | 2/2010 | Li et al. | 33/471 |

* cited by examiner

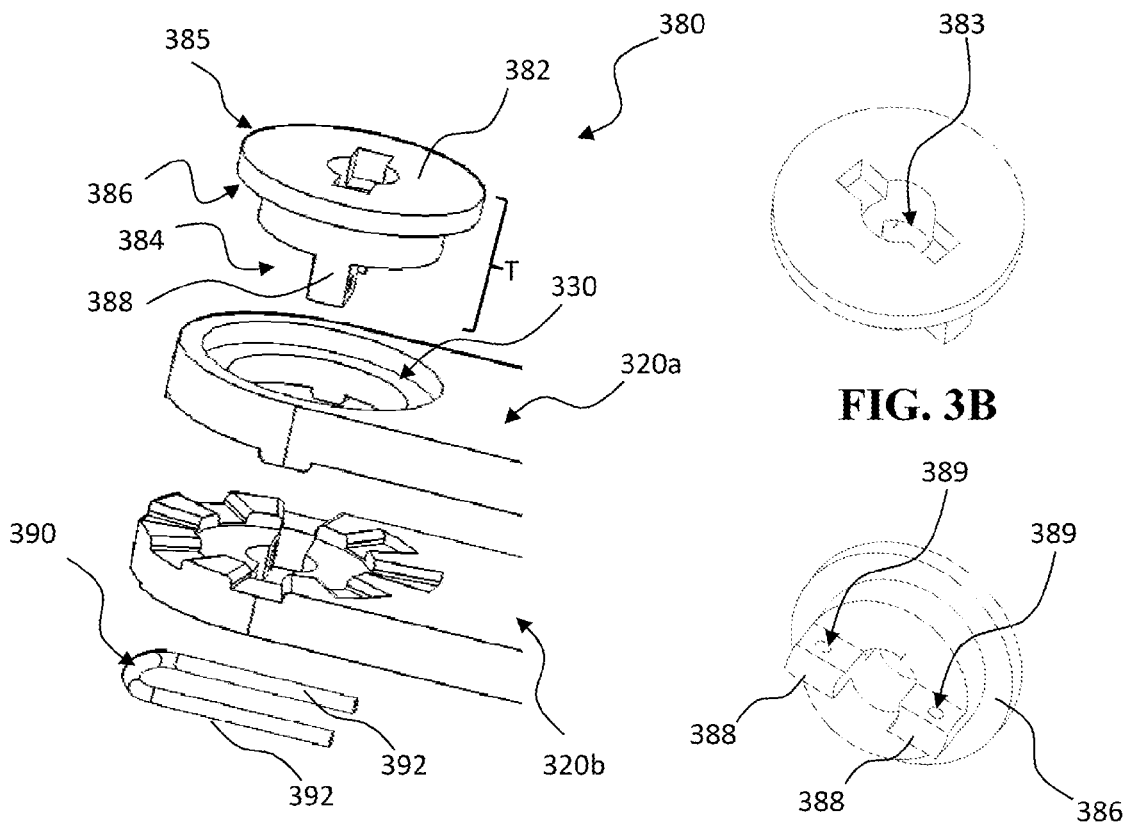
FIG. 3A
FIG. 3B
FIG. 3C
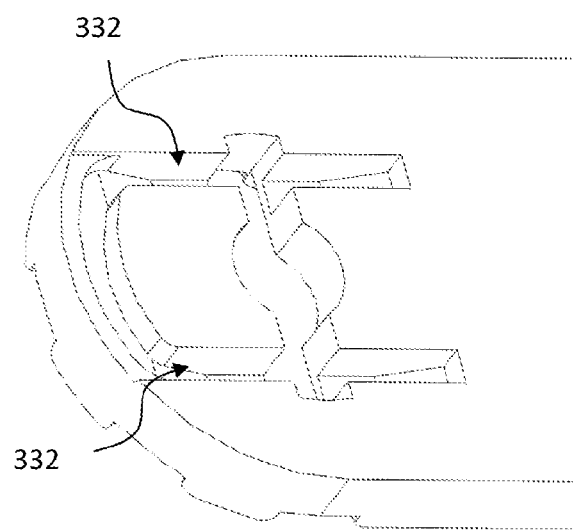
FIG. 3D

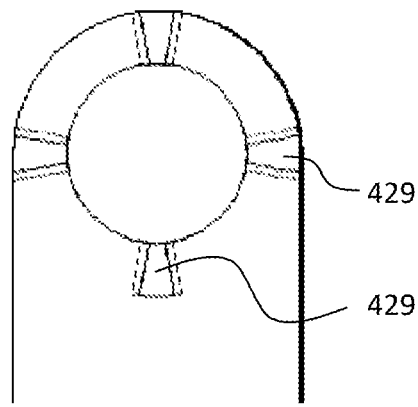
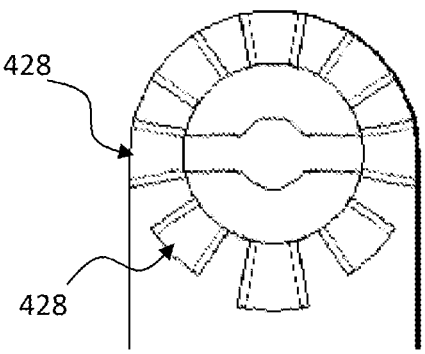
FIG. 4A    FIG. 4B
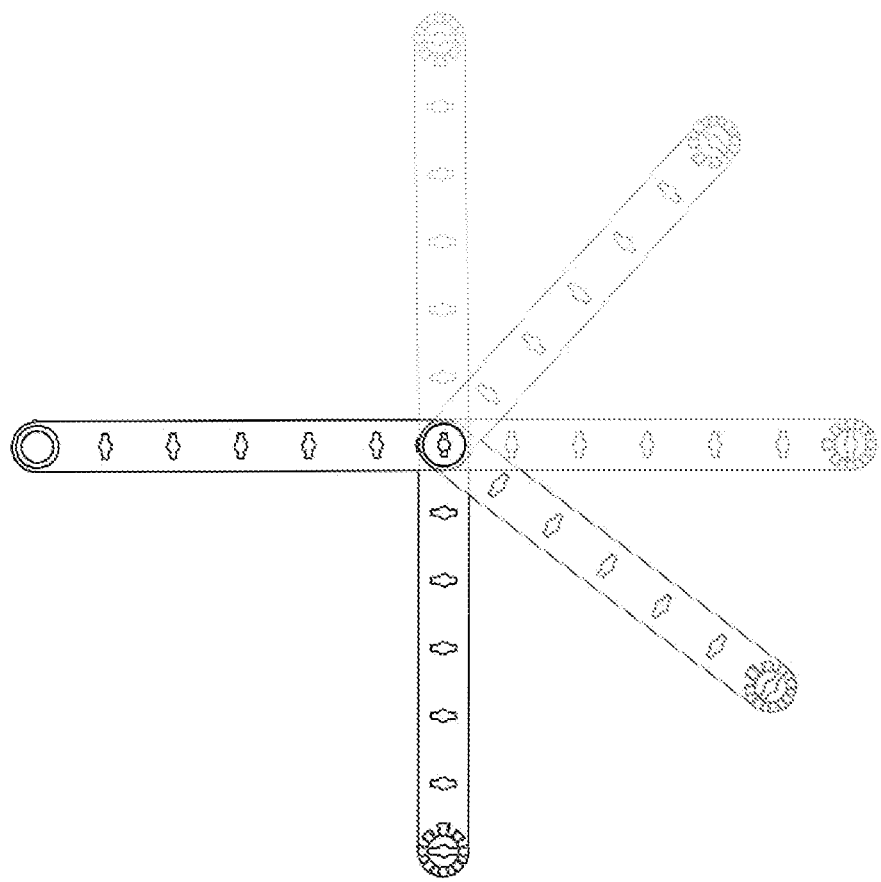
FIG. 4C

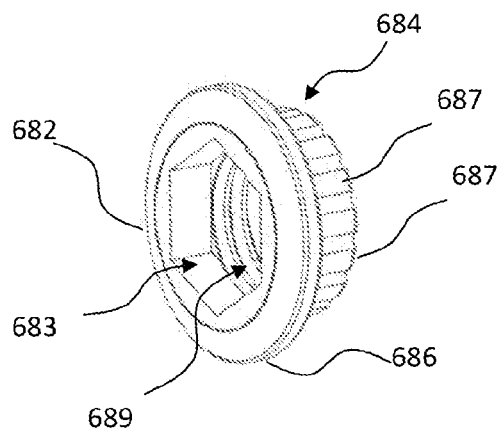
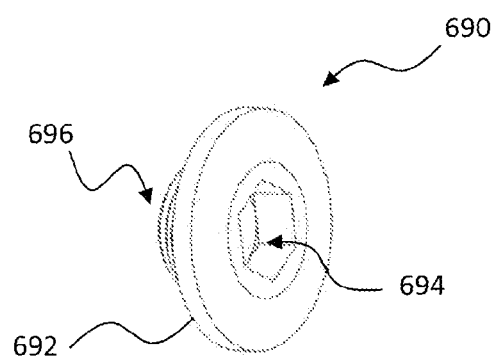
FIG. 6A  FIG. 6B
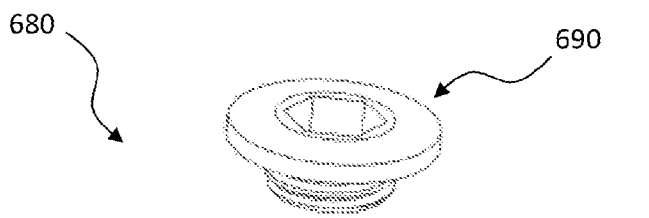
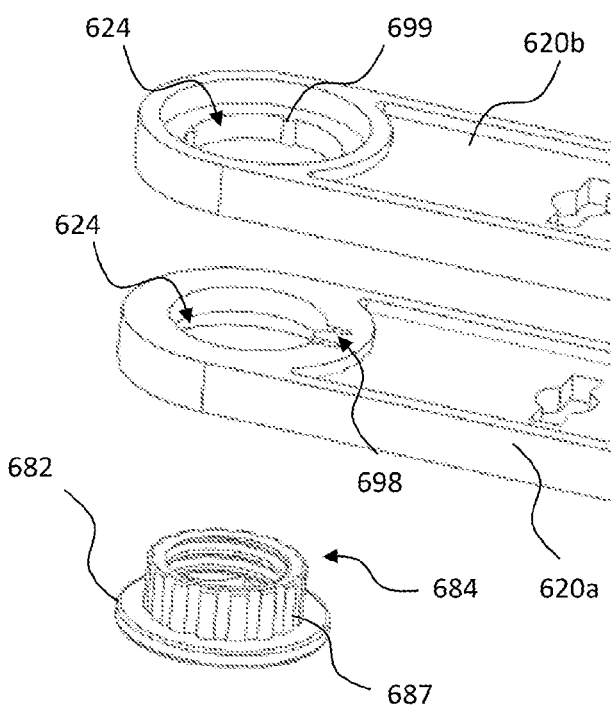
FIG. 6C

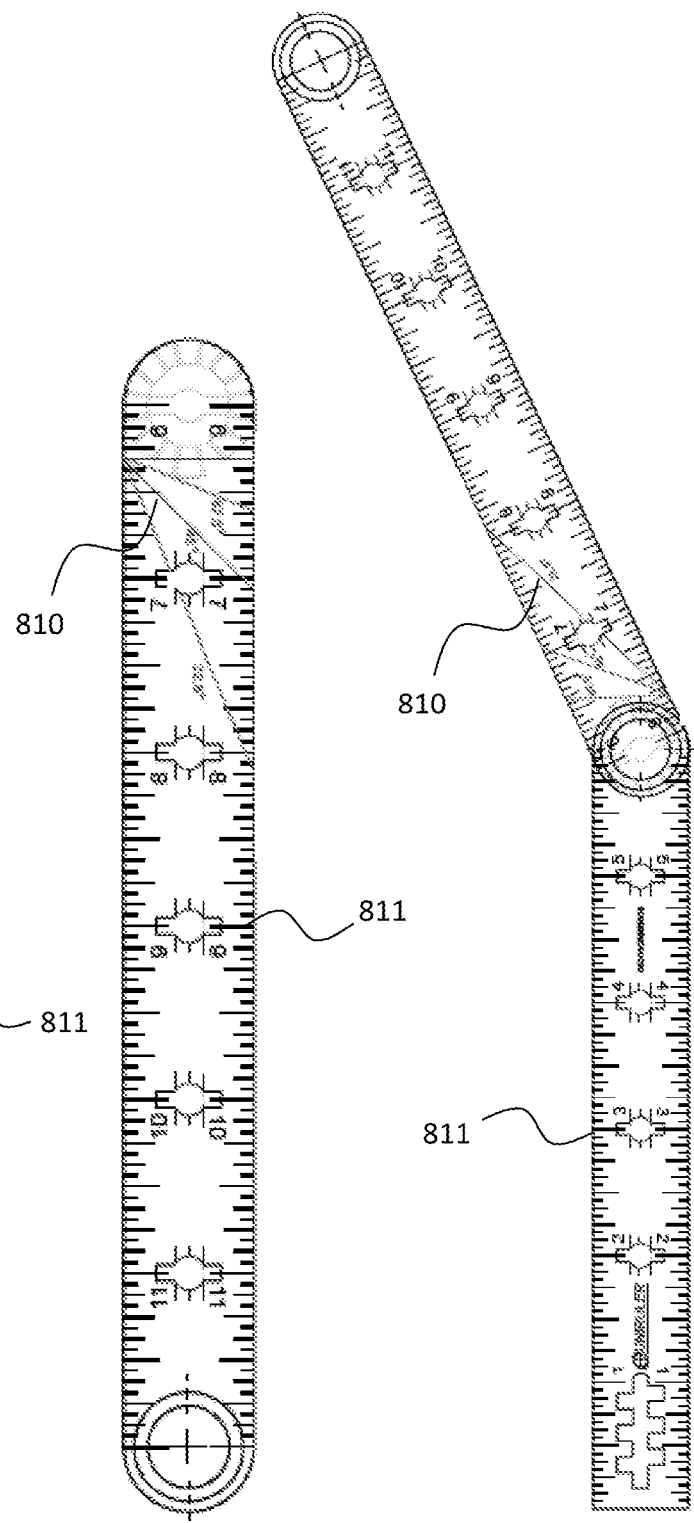
FIG. 8A  FIG. 8B  FIG. 8C

SEGMENTED MEASURING ASSEMBLY AND METHOD OF USE

CROSS-REFERENCE TO RELATED APPLICATIONS

This application claims the benefit of U.S. App. No. 61/506,573, filed on Jul. 11, 2011, and U.S. Pat. App. No. 61/468,055, filed on Mar. 27, 2011, the entire contents of both are incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to systems for enabling the measurement and marking of distances and angles.

2. Description of the Prior Art

Rigid folding rulers have been known for some time. Such rulers include the folding ruler disclosed in U.S. Pat. No. 7,111,408, filed on Feb. 2, 2005 to James M. Critelli et al., and U.S. Patent Pub. No. 2003/000096A1, published on Jan. 2, 2003 to Chien-Kuo Wang. The entire contents of both references are herein incorporated by reference.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented.

One example embodiment of the segmented measuring assembly comprises a first and second ruler section and a pivot connection system connecting the distal end of the first ruler section and the proximal end of the second ruler section whereby the second ruler section can pivot in relation to the first ruler section about the pivot connection system.

One example embodiment of a segmented measuring assembly comprises a first and second ruler section, each ruler section having a section length, a section width and a section thickness, each ruler section further comprising a section proximal end, a section distal end and a plurality of section key holes extending through the section thickness along the section length, and a pivot connection system connecting the distal end of the first ruler section and the proximal end of the second ruler section whereby the second ruler section can pivot in relation to the first ruler section about the pivot connection system. In some embodiments, each ruler section further comprises length indicating markings at about 1 inch increments about each section length, the key holes comprise an elongated channel extending perpendicular to the length of the ruler section and extending through the section thickness and the elongated channel further comprises a rounded portion with a radial center positioned at a point about ⅜ of an inch from an edge of the ruler section. In some embodiments, the proximal end of the second ruler section and the distal end of the first ruler section are each curved ends whereby there is no overhang of the curved ends when the ruler sections pivot in relation to each other. In some embodiments, the pivot connection system further comprises a connector hole. In some embodiments, the pivot connection system comprises a disc shaped head configured to engage a first retaining surface on the first ruler section whereby the head is retained relative to the first ruler section, a connector hole extending through a head thickness, at least one prong extending from a bottom of the head, a first end hole through the first ruler section thickness to receive the at least one prong, a second end hole through the second ruler section thickness to receive the at least one prong, and a retaining pin configured to engage the at least one prong and a second retaining surface on the second ruler section whereby the head is retained relative to the second ruler section. In some embodiments the first and second ruler sections each having inside joint surfaces, the inside joint surface of one of the first or second ruler sections has protrusions located radially about the first through hole and the other inside joint surface of the first or second ruler section has mating recesses located radially about the second through hole whereby the protrusions engage the recesses as the first ruler section pivots relative to the second ruler section. In some embodiments, the protrusions engage the recesses resiliently at predetermined stop points. In some embodiments, the proximal end of the first section further comprises a scribing through hole extending through the section thickness. In some embodiments, the first and second ruler section ends each having an inside edge and an outside edge, one of the first and second ruler sections ends having predetermined angle markings corresponding to an angle between the outside edges of the first and second ruler sections and an aligning element of one of the first and second ruler sections to align with the angle markings on the other ruler section whereby the markings identify the angle between the outside edges of the ruler sections.

In one example embodiment of a pivot connection system for a segmented measuring assembly, the pivot connection system comprises a first ruler section end having a first end hole, a first retaining surface, a second ruler section end having a second end hole, a second retaining surface, a connector assembly comprising a connector and a retaining element, the connector having a connector head and a connector base and a connector hole extending through the connector, the connector head shaped to engage the first retaining surface, the connector base shaped to extend through the first retaining surface and the second retaining surface and the retaining element configured to engage the connector base and the second retaining surface whereby the connector pivotally connects the first ruler section and the second ruler section. In some embodiments, the base further comprises at least one prong extending from a bottom of the connector head, the prong having a prong through hole and the retaining element is an elongated resilient retaining pin shaped to be received in the prong through hole and shaped to engage the second retaining surface. In some embodiments, the retaining pin has a proximal end and a distal end and the second retaining surface is an uneven surface supporting the proximal end and distal end of the retaining pin and defining a gap between a middle portion of the second retaining surface and a middle portion of the retaining pin when the pivot connection system is at rest. In some embodiments of the pivot connection system, the connector head has a circumferential surface, the circumferential surface has a plurality of protrusions extending from the circumferential surface and a plurality of recessed points recessed relative to the protrusions and the pivot connection system further comprises a ratchet pin engaging the protrusions on the circumferential surface whereby the ratchet pin resists the pivot of the first ruler section relative to the second ruler section. In some embodiments, the connector further comprises a connector threaded portion and the retaining element comprises a retaining lip, a connector hole extending through the retaining element and a retaining element threaded portion configured to mate with the connector threaded portion whereby the connector threaded portion and the retaining element threaded portion removably connects the first and second ruler sections. In some embodiments, the first end hole have a first center and the center having a first centerline distance to a first ruler section end edge, the first ruler section end having a curved shape defined by a curve radius not to exceed the first centerline distance, the second end hole having a second center and the center having a second centerline distance to a second ruler section end edge and the second ruler section end having a curved shape defined by a curve radius not to exceed the second centerline distance whereby the ruler section end edges do not extend beyond each other when the first ruler section pivots relative to the second ruler section.

In one example embodiment of an angle measurement system for a segmented measuring assembly, the angle measurement system comprises a first and second ruler section, each ruler section having a section length, a section width an inside edge and an outside edge, one of the first and second ruler sections having angle markings corresponding to an angle between the outside edges of the first and second ruler sections when the angle is less than about 90 degrees and an aligning element of one of the first and second ruler sections to align with the markings whereby the markings identify the angle between the outside edges of the ruler sections. In some embodiments, the aligning element is an inside edge of the first ruler section and the angle markings are on the second ruler section. In some embodiments, the aligning element comprises an angle slide slidably engaged with the first ruler section, the angle slide is configured to slidably obstruct an overlap of the inside edges of the first and second ruler sections; and the angle slide having a pointer element aligning with the angle markings on the first ruler section whereby the pointer element identifies the angle between the edges of the ruler sections.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates an exploded view of one embodiment of a pivot connection system;

FIG. 3B illustrates a top perspective view of one embodiment of a cap;

FIG. 3C illustrates a bottom perspective view of one embodiment of a cap showing prongs extending from the bottom of the cap;

FIG. 3D illustrates a back perspective view of a portion of one embodiment of a ruler section showing a retaining surface;

FIG. 4A illustrates a back view of a portion of one embodiment of a ruler section showing multiple protrusions around the through hole;

FIG. 4B illustrates a front view of a portion of one embodiment of a ruler section showing multiple recesses around the through hole;

FIG. 4C illustrates view of one embodiment of a measuring assembly showing the stops resulting from a pivot connection with surfaces as shown in FIGS. 4A and 4B;

FIG. 6A illustrates a perspective view of one embodiment of a cap;

FIG. 6B illustrates a perspective view of one embodiment of a retaining element;

FIG. 6C illustrates an exploded view of one embodiment of a pivot connection system utilizing the cap and retaining elements of FIGS. 6A and 6B;

FIG. 8A-8C illustrate example embodiments of ruler section illustrating example of length indicating markings, angle markings and the alignment of the markings and through holes;

DETAILED DESCRIPTION OF THE INVENTION

A segmented measuring assembly will now be described in detail with reference to the accompanying drawings. It will be appreciated that, while the following description focuses on an assembly that collapses and includes features beneficial to those in the trades of carpentry and masonry, the systems and methods disclosed herein have wide applicability. For example, the segmented measuring assembly described herein may be readily employed with painting, maintenance or other trades dealing with measurements, marking and angles. Notwithstanding the specific example embodiments set forth below, all such variations and modifications that would be envisioned by one of ordinary skill in the art are intended to fall within the scope of this disclosure.

Figure 1A:
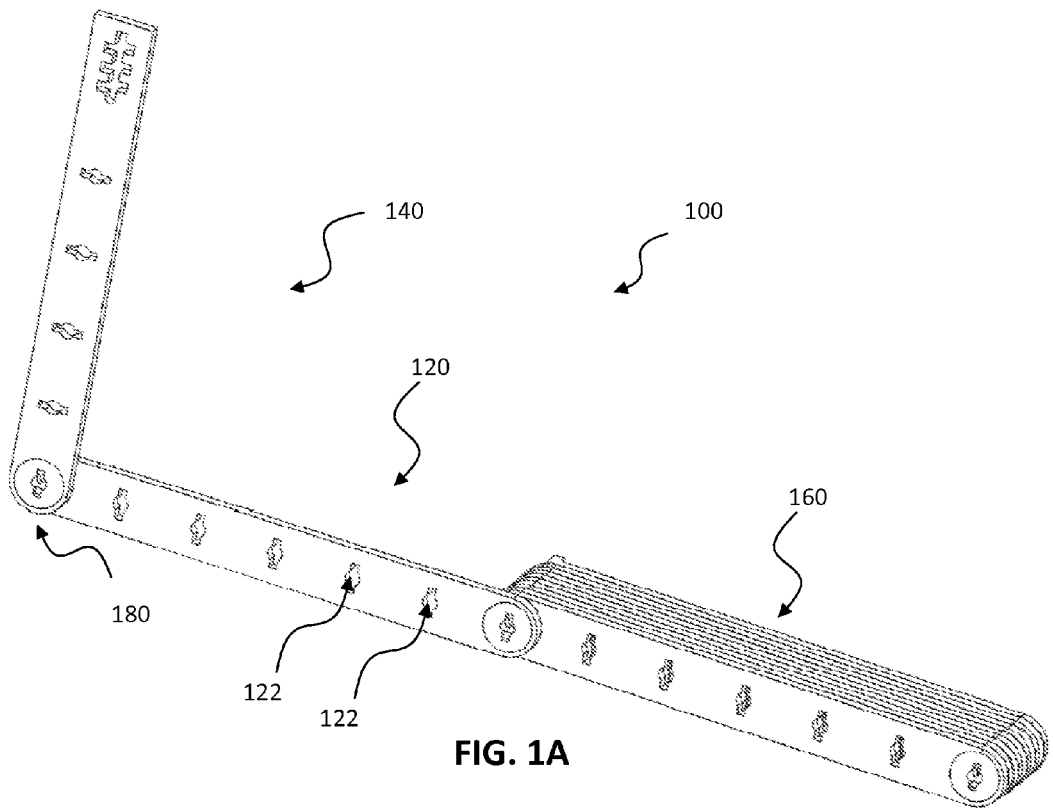
FIG. 1A illustrates a side perspective view of one embodiment of the segmented measuring assembly partially extended.
Figure 1B:
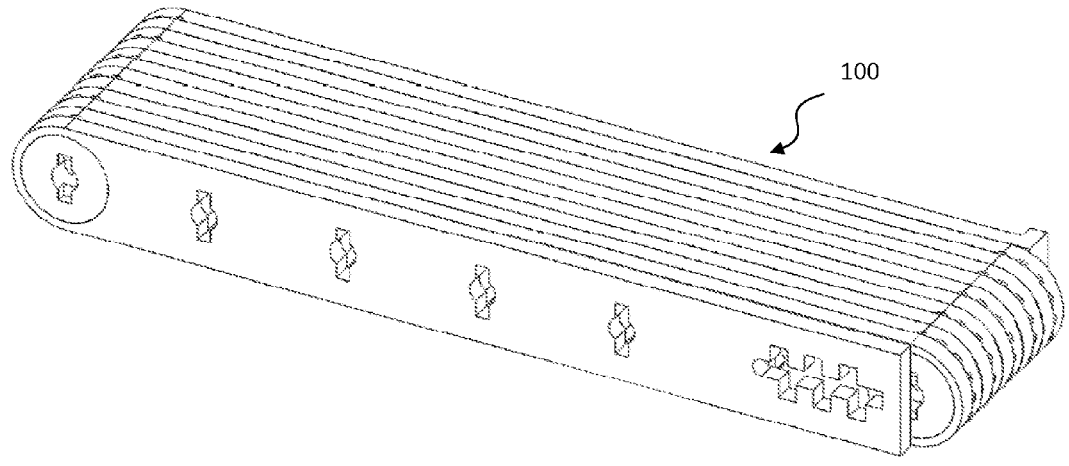
FIG. 1B illustrates a side perspective view of one embodiment of the segmented measuring assembly in a collapsed position.

One Embodiment of the Segmented Measuring Assembly:

For illustration purposes and not for limitation, one embodiment of the present invention is shown in FIGS. 1A and 1B. As shown in the embodiment of FIG. 1, the segmented measuring assembly 100 generally comprises a plurality of ruler sections 120, 140 and 160 pivotally connected by a pivot connection system 180. As shown, the ruler sections may comprise multiple sections including intermediate ruler sections 120, a starting ruler section 140 and an end ruler section 160. FIG. 1A shows the measuring assembly in a partially extended configuration and FIG. 1B shows the assembly in a collapsed configuration.

Some embodiments of the ruler sections further comprise through holes 122 extending through the thickness of the sections. The section through holes can be any shape that has a portion of the hole extending through the ruler section. Circular, square and rectangular shapes are examples of suitable shapes for the through hole. In some embodiments, the through holes are key hole shaped so that they easily allow the insertion of a marking device such as a carpenter's pencil. When the through holes are positioned at regular increments, such as at 1 inch increments, the through holes can be used to insert a marker and mark an underlying surface. The through hole also allows the user to make marks on the surface being measured at the center of the width of the ruler, in addition to the outside of the ruler rather than only allowing the marking on the outside of the ruler as with prior art rulers. The integration of a through hole in ruler sections also enables the user to accurately mark arch lines and angle lines by fixing one point of the assembly through any given hole, and using a marking device in a hole in another end of the assembly to scribe an arching line while pivoting that end of the assembly and the marking device about the fixed point.

Example embodiments of the ruler sections are shown in FIGS. 2A-2E. In one embodiment, the ruler sections comprise a starting ruler section 240, one or more intermediate ruler sections 220 and an end ruler section 260.

Figure 2A:
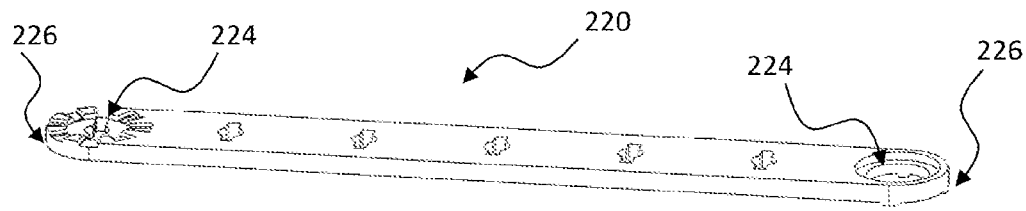
FIG. 2A illustrates a perspective view of one embodiment of an intermediate ruler section.

As shown in FIG. 2A, the intermediate ruler section 220 comprise an elongated generally planar section having a length, width, thickness and an end hole 224 proximal to each end 226 of the section. The end hole extends through the thickness of the section.

Figure 2B:
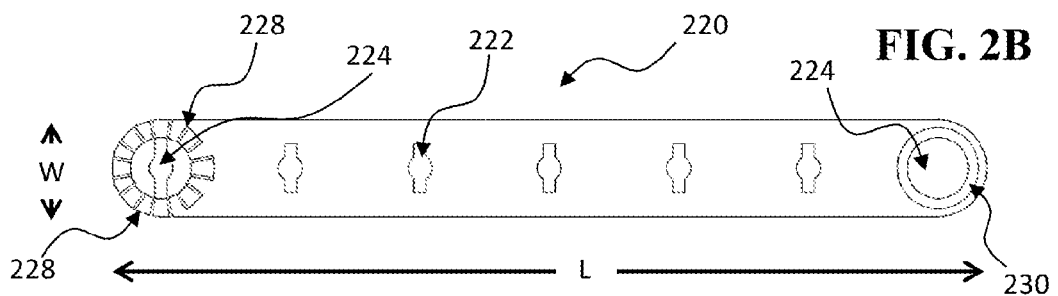
FIG. 2B illustrates a front view of one embodiment of an intermediate ruler section.

FIG. 2B illustrates the length L and the width W of an example section. Although the dimension of the intermediate section can be varied to accommodate different purposes and measurement systems, one embodiment of the section has a length ranging from about 4 to 7 inches. In example embodiments, suitable intermediate section lengths allow embodiments of the length between pivot connections to coincide with common measurements such as 6 inches as ½ of a foot, 4 inches as ⅓ of a foot, 12 inches as a foot. The intermediate section width can also be varied. One embodiment of the intermediate section has a width range of ½ of an inch to 1 inch and other embodiments have a width of about ¾ of an inch. At ¾ of an inch width, the ruler sections can be used to measure a centerline distance of ⅜ of an inch as the distance from the edge of the section to a centerline point in the middle of the section width. For a mason, the ⅜ths of an inch is a common measurement because it is a common thickness of a brick mortar joint. For a carpenter, the ¾ inch width also allows the user to quickly make ¾ inch measurements which are commonly used as ½ of the thickness of 2×4, 2×6, 2×8 lumber. The intermediate section thickness can be varied to any dimension that maintains the portability of the ruler and maintains some rigidity in the section. In one embodiment, the intermediate section sections have a thickness ranging from about 1/16 inches to more than ¼ of an inch. In one embodiment, the thickness is about 5/32 of an inch thick providing the ruler with greater strength. Similar dimensional relationships/ratios of the section length and thickness are suitable for other measuring standards such as but not limited to metric standards. For some embodiments, depending on the material the sections are made from, it may be preferable to have a length to thickness ratio less than about 40:1 so that the sections have sufficient rigidity for field use.

The ruler sections may be made from any material that provides sufficient rigidity to maintain its shape but durable enough to withstand use in environments such as indoor and outdoor construction sites. Suitable materials to make the ruler sections include wood, metal, plastic, resins and any combination thereof.

In the embodiments described below, and shown in FIGS. 1A-1B and 2A-2C, the intermediate ruler sections comprise a length of about 6¾ inches, a width of ¾ inches and a thickness of about 5/32 inches. In this embodiment, the distance between the center of the pivot connectors is about 6 inches and the resulting intermediate ruler sections are generally 1¼ inches shorter than traditional folding rulers making it more compact and easier to store.

Figure 2C:
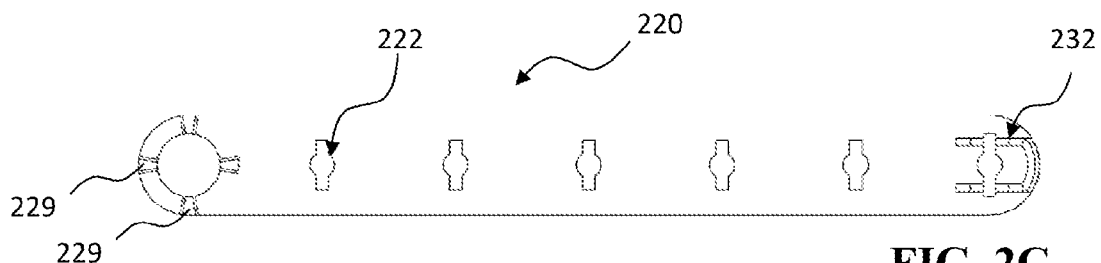
FIG. 2C illustrates a back view of one embodiment of an intermediate ruler section.

As shown in the intermediate section of FIG. 2A-2C, each of the intermediate sections 220 has an end hole 224 positioned near each end. Embodiments of the end holes 224 are shaped to cooperate with the pivot connection systems that connect the ruler sections and allow them to pivot in relation to each other. The intermediate section ends 226 are generally rounded so that when the ruler section end edges overlap, they can pivot without have portions of one end extend beyond the other end.

As shown in FIG. 2B, showing the front of one embodiment, one end of the intermediate section has an uneven surface portion positioned radially around the end hole 224 of that end of the section, such as a plurality of recesses 228. The other end of the section has a retaining surface to retain elements of the pivot connector system. In this embodiment, the retaining surface is a recessed channel 230 around the end hole creating a step within the end hole 224.

As shown in FIG. 2C, showing the back of one embodiment, one end of the intermediate section 220 has an uneven surface portion, such as the plurality of protrusions 229 extending from the surface of the section. The other end of the back has a retaining surface to retain elements of the pivot connector system. In this embodiment, the retaining surface is a u-shaped recessed channel 232 that receives a retaining pin from the pivot connector system.

Figure 2D:
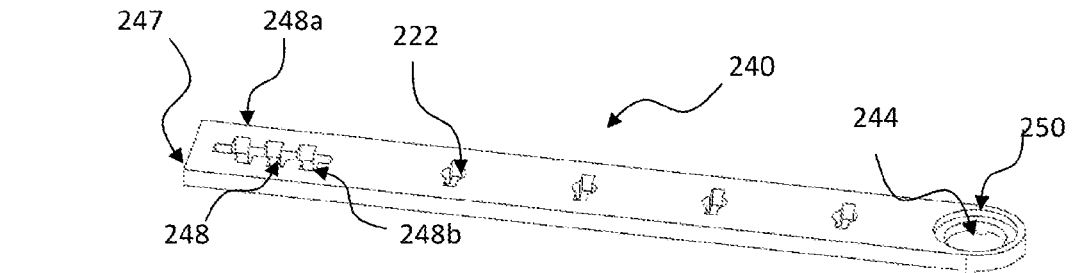
FIG. 2D illustrates a front perspective view of one embodiment of a starting ruler section.

FIG. 2D illustrates a front perspective view of one embodiment of a starting ruler section 240. This starting ruler section 240 has one end with an end hole 244 and the retaining surface 250. This ruler section also has a scribe tip 248 proximal to the other end, the scribe tip end 247, of the section. This end of the ruler section defines a scribing tip 248 designed in an offset key slot design extending through the ruler section thickness. The offset key slot design has one side with multiple ⅛th inch slots 248a dimensioned starting from a 1/16th inch mark from the section end extending to the 1 inch marking. The scribing tip has another design of key slots 248b on the other side of the scribing tip which are offset 1/16th inch from each of the key slots on the other side of the section. When used with other ruler elements, through holes or markings on the ruler section, these scribing tip key slots allow the ruler to locate a scribe at any 1/16th inch increment by the staggered 1/8th in slots allowing the ruler to scribe 1/16th inch dimensions from the end of the section or from another point on the measuring assembly. The peg like design of the key slots of the scribing tip allow placement of a carpenter size pencil, regular standard pencil, marker, utility knife, or any type of marking utensil. The scribing tip design also allows user to see directly through the tip to the work piece allowing the user to align the ruler with measurement markings. The scribing tip also allows user to see through to outer edge of stock to align quickly needed overhang measurement or depth measurement. When the scribing tip pivots from an inside corner, the scribing tip can be used to scribe an arc from the inside corner to define a curve for purposes such as allowing proper division of the wall angle.

For embodiments of the scribe tip that are part of a starting ruler section based on the metric measuring system, the dimensions of the key slots can be modified to allow for a similar offset slot design at metric increments that allow for finer metric measurements when used with the other measuring assembly elements.

The dimensions and the material of the starting ruler section are similar to those of the intermediate section. However, the overall length is slightly shorter to accommodate for the absence of a pivot connection at the scribe tip end. Therefore, the length of the starting ruler section is shorter to ensure the distance between the radial center of the end hole on the other end is an increment desired. For the example embodiment shown, the distance between the center of the end hole 244 to the end of the scribe tip end 247 is about 6 inches.

Figure 2E:
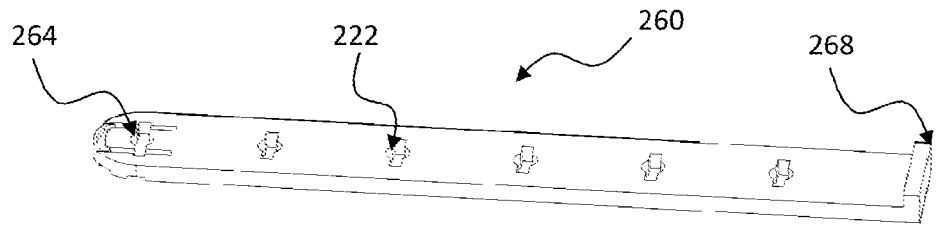
FIG. 2E illustrates a back perspective view of one embodiment of a end ruler section.

FIG. 2E illustrates a back perspective view of one embodiment of an end ruler section 260. This ruler section has one curved end with an end hole 264 and the retaining surface. This ruler section also has a flange tip 268 proximal to the other end of the section. This end of the ruler section defines a flange tip 268 designed to project from the surface of the end ruler section 260. For example and not for limitation, the flange tip 268 projects from the surface at a distance of 1/8th of an inch. The flange tip 268 may act as a grabbing edge similar to the end of a measuring tape for quick placement and accurate measurements.

The dimensions and the material of the end ruler section are similar to those of the intermediate section. However, the overall length is slightly shorter to accommodate for the absence of a pivot connection at the scribe tip end. Therefore, similar to the starting section, the length of the end ruler section 260 is typically shorter to ensure the distance between the center of the end hole 264 and the flange tip 268 on the other end is an increment desired. For the example embodiment shown, the distance between the center of the end hole to 248 the end of the flange tip 268 is about 6 inches As shown in the embodiments of FIGS. 2A-2E, the ruler sections may also have through holes 222 extending through the thickness of the sections. In some embodiments, the through holes 222 are positioned along the length of the ruler sections at regular predetermined locations. In some embodiments, the predetermined locations are at regular increments that align with other length indicating measurement markings on the sections. The regular increments can be any increment that is helpful for the user such as, but not limited to, every inch, metric increments or other increments significant to particular trades. Using an example of regular inch increments, this increment allows the through hole to be used to fasten the ruler section onto work surfaces, even vertical, horizontal, upside down and flat, at any 1 inch increment. Through hole slots 222 located at inch markings in this embodiment combined with the scribing tip allow the user to create any size measurement curve or straight line mark at increments as small as 1/16th of an inch. The through hole 222 design located at inch markings also allow user to create multiple curves from any given pivot point. The through hole design located at inch markings allow perfect placement of a carpenter pencil, standard pencil, marker, utility knife, or any type of marking utensil through the through hole. The through hole location at inch markings allow the user to see directly to through to work piece to quickly align radial lines to outer curves for creating sunburst or arc design. Through hole design located at inch markings allows user to see through to work piece to quickly make 3/8th measurements to outer edges of ruler dimension.

The through hole design enables different functions when the through hole is used to anchor the measuring assembly to a surface. The through hole design located at regular increments aligned with regular markings allows the user, once an angle is found, to form different shapes by anchoring the ruler section to the work surface using other through holes with a nail or screw. Through holes located at regular intervals also allow user to quickly create multiple curves while placed against edge of work piece. The through hole shape helps keep an inserted marking device from moving within the through hole while scribing measurements giving the user greater accuracy.

Using the through holes in conjunction with the flange tip, the user can quickly make fast accurate scribes on a surface in regular increments by hooking the flange on one edge of the surface and scribing through the through holes.

In some embodiments, the through holes are shaped as key holes. As an example only and not for limitation, these key hole shapes can be designed with a rounded portion in the center, with peg like openings, or elongated channels, on either side of the rounded portion. This shape is convenient for retaining the oblong shape of a carpenter's pencil and allowing the user to accurately align measurement markings on center to quickly make markings on the outer edge of the ruler section. As an example, and not for limitation of the key hole shape, the rounded center portion is a 3/16th inch diameter hole located on center of the section width and the elongated channel are two 3/32nd inch by 3/32nd elongated channels. This example shape allows the user to quickly make 3/8th inch marking from the section center to the outer edge of the section.

In embodiments of the segmented measuring assembly, the ruler segments are connected to other segments with a pivot connection system. The pivot connection system generally comprises a pivot connection assembly connecting one end of a ruler section with the end of another ruler section so that the ruler sections can pivot 360 degrees in relation to each other about the pivot connector assembly. The pivot connection system can be designed to eliminate the overhang of curved shaped ends of the ruler sections and allows a scribe mark to be made down the length of the measurement assembly without obstructions caused by overhanging ends of ruler sections. In some embodiments, the pivot connection system resiliently connects the ruler sections so that the ruler sections may pivot while still being held tightly together. And in some embodiments, the pivot connection system resiliently biases the ruler sections into certain configurations, such as collapsed, extended or at pre-determined angles so that accurate length and angle measurements can be made with the assembly.

One embodiment of a suitable pivot connection system is shown in FIGS. 3A-3D. In this embodiment, the pivot connection system 380 comprises two ruler sections and a pivot connector assembly. As an example, the ruler sections are intermediate ruler sections that have the back of a first section 320a mate with the front of a second section 320b. The surfaces that mate define the inside joint surfaces. On the back of the first surface, within the through hole, is the first retaining surface 330. Although not shown in FIG. 3A, the back side of the second ruler section 320b has a retaining surface. The pivot connector assembly in this embodiment comprises a connector 382 and a retaining element 390. The connector has a base 384 that fits through the end holes and is retained by the first retaining surface on the first ruler section that engages a retaining lip 386 on the connector 382. The retaining element in this embodiment is a retaining pin 390 that connects with the base 384, here prongs 388, that extends from the connector through the through hole in both the first and second ruler section. The retaining pin 390 engages the second retaining surface to connect the first and second ruler sections between the connector and the retaining pin.

FIG. 3B illustrates one embodiment of the connector 382 with a connector hole 383 extending through the thickness (T of FIG. 3A) of the connector. FIG. 3C illustrates one embodiment of the connector with the retaining lip 386, the prongs 388 and pin holes in the prongs 388 to receive the retaining pin 390. In these embodiments, the connector 382 comprises a connector head 385 and a connector base 384. The connector head 385 has a retaining lip 386 that is sized to have a portion retained against a retaining surface in the ruler section end hole and is shaped to allow other ruler sections to slide over it when the measuring assembly is in a collapsed position. The connector base 384 is shaped to extend through the end hole and connect with the retaining element. In the embodiment shown, this shape includes at least one elongated prong 388 extending from the bottom of the connector head 385. The prong extends through the end holes of both ruler sections and extends far enough into the second ruler section such that the retaining element can connect to the prongs. Here, the retaining pin is inserted into pin holes in the prongs. In this embodiment, there is also a connector hole 383 extending through the connector head 385 and connector base 384. This connector hole 383 extends through the thickness of the pivot connector assembly (the connector 382 and the retaining elements 390). In some embodiments, the connector hole is shaped like a key hole. The pivot connection system retaining element retains the connector base and connector head. In this embodiment, the retaining element is a u-shaped retaining pin 390 having two extending fingers 392 that can be held within the holes 389 of the connector base prongs 388. The retaining pin 390 rests against the retaining surface of the second ruler section 320b. Preferably, the retaining pin 390 and the retaining surface allow the pin to provide some resiliency to the pivot connection system. In this embodiment, as shown in FIG. 3D, the retaining surface 332 is an uneven surface, being concave under the length of the pin fingers with a gap under the middle portion of the retaining pin and pin fingers when the fingers are not flexed so that the connected connector base can move deeper and shallower within the ruler section end hole. This resiliency and the uneven retaining surface allow the two ruler sections to have some movement between the joint surfaces so that the ruler sections can pivot through the engagement of protrusions and recesses at the inside joint surface. The resiliency created by the retaining element and retaining surface design is also enhanced by the elastic properties of materials such as the ruler section materials.

When connected, the connector head, the connector base and the retaining element preferably do not extend beyond the outside surfaces of the ruler sections so that other ruler sections can be collapsed over that pivot connection.

As described for example purposes only, the pivot connection system shown in FIGS. 3A-3D has curved ruler section ends with about a ¾ inch diameter. The end hole design allows an end hole proximal to either end of intermediate ruler sections.

With this pivot connection system embodiment, there is no overhang of the curved portions of the ruler sections beyond the dimensions of the ruler. This is accomplished by having the curved ends of the ruler sections having a curve radius that does not exceed a centerline distance, across the section's width, between the center of the connector hole and the edge of one of the ruler sections. In the embodiment shown, as the edges of the curved edges of the ends of the ruler sections overlap when pivoting, their edge surfaces are flush with each other. Other embodiments may have one section end shaped, not necessarily as a curve, but fitting with the curved end of the other ruler section so that the one section end does not overhang outside of the curve radius of that other ruler section. Additionally, with ends that do not overhang outside of the above defined curve radius, users can quickly replicate wall angles, particularly inside wall angles for fast transfer of angles to work pieces. Users can also use the pivot connector assembly as the origin of an arch by securing the measuring assembly to a surface through the through hole with a tool such as a nail. The pivot connection system also allows the user to figure miter and bevel cuts for joining two work pieces together.

Details of an example embodiment wherein the pivot connection further comprises multi-position stop points is also shown in FIGS. 4A-4C. When used with a resilient pivot connector assembly, the pivot connection system can provide a locking feature that biases the ruler into predetermined angular positions as well as in the closed or unfolded positions at predetermined stops points. As shown in FIGS. 4A-4C, one embodiment of the pivot connection system further includes a pivot connection system with a multi-position stop design. With these embodiments, the inside joint surfaces of the ruler sections have uneven surfaces with mating protrusions and depressions. FIG. 4A shows an example of the protrusions 429 on the back of one end of a ruler section and FIG. 4B shows an example of mating recesses 428 on the front of one end of another ruler section. When these two surfaces are used as the inside joint surfaces, the resilient properties of the connection system allow the ruler section to rotate and the inside joint surfaces engage each other and create pivot stops of one ruler section related to the other. As shown in FIG. 4C, the pivot connection system design of FIGS. 4A and 4B define stops at pre-determined common angles of about 45 degrees. Other designs can create pivot stops increments of less than about 91 degrees, less than about 46 degrees and less than about 23 degrees. For example, suitable designs provide angular stops at angles such as but not limited to 22.5, 45, 67.5, 90, 112.5, 135, 157.5 and 180 degrees. Pivot connection systems can also be used that create pivot stops at only 0 and 180 degrees.

In one embodiment of the measuring assembly, the pivot connection system for the starting section the intermediate sections have pivot stops at 180 degrees and the pivot connection system for the end section and the connected intermediate section has pivot stops at 0, 90 and 180 degrees.

Figure 5A:
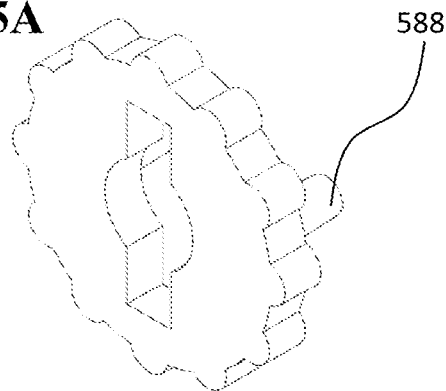
FIG. 5A illustrates a top perspective view of one embodiment of a cap with multiple protrusions around the edge of the cap.
Figure 5B:
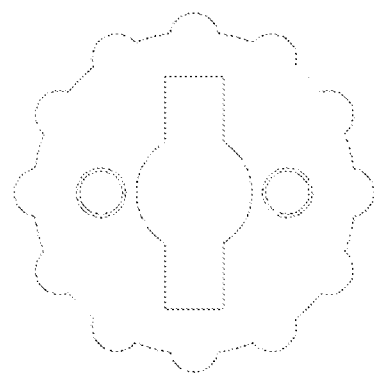
FIG. 5B illustrates a top view of the embodiment of 5A.
Figure 5C:
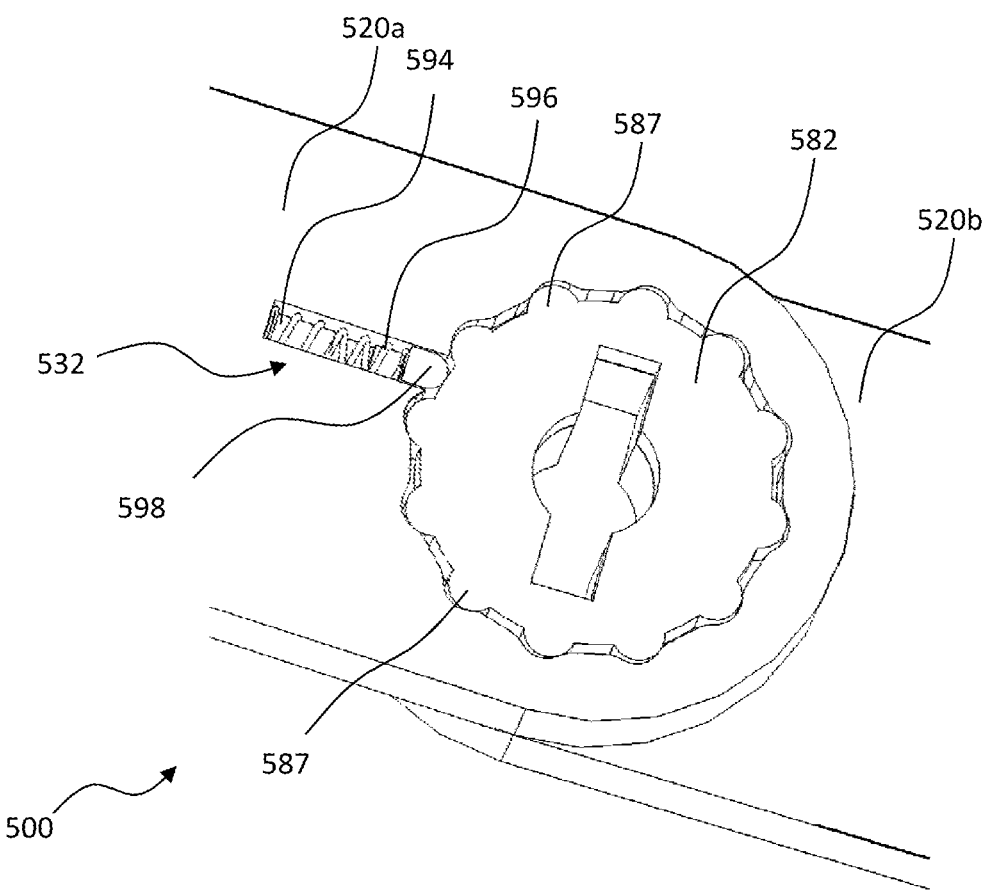
FIG. 5C illustrates one embodiment of a pivot connection system having a ratchet.

In yet another embodiment of the pivot connection system shown in FIGS. 5A-5C, the pivot connection system may further include a ratchet. The ratchet design provides the pivot connection system with variable resistance to pivoting as the sections pivot relative to each other. The variable resistance can bias the pivot so that, like the multi-position stop, the sections are biased to stop at predetermined positions such as predetermined angles. In the example ratchet hinge embodiment shown in FIG. 5C, the pivot connection system 500 includes a connector 582 having a head with a circumferential surface. The circumferential surface has outward raised and recessed points, such as the outward facing circumferential protrusions 587 and the gaps between them. In this embodiment, the connector head is retained by a retaining surface of a first ruler section 520*a* and it is secured to the other second ruler section 520*b*. The first ruler section 520*a* also has a ratchet channel 532 with a spring anchor 594 and a resilient ratchet assembly comprising a ratchet pin 598 and a spring 596. As shown, one end of the spring 596 is secured in the ratchet channel 532 by sliding over the spring anchor 594 and the other end of the spring 596 is attached to the ratchet pin 598. When the ratchet assembly is secured in the ratchet channel 532, and the connector head is secured in the end hole, the ratchet pin 598 is biased against the protrusions 587 of the head 585. As shown, the head protrusions 587 and the ratchet pin 598 frictionally and resiliently engage each other so that the pin 598 creates a resistance to the head 584 pivoting. Further, the end hole of the first ruler section 520*a* end hole may have inward facing circumferential depressions and protrusions to frictionally assist in providing resistance to the pivoting of the head and the two ruler sections. In this embodiment, as shown in FIG. 5A, the connector base has prongs 588 that retain the connector into the second ruler section.

In another embodiment of the pivot connector assembly shown in FIGS. 6A-6C, the pivot connection system 680 further includes a removable pivot connection assembly comprising a connector 682 and a retaining element 690. In the illustrated example embodiment, the connector 682 of FIG. 6A has a retaining lip 686, a connector hole 683 and a connector base 684 with protrusions 687 along the outside surface. The connector base 684 also has a connector threaded portion 689 on the inside surface of the connector hole. The retaining element 690 in FIG. 6B has a retaining lip 692, a connector hole and a retaining element threaded portion 696 on the outside neck of the element that mates with the connector threaded portion of the connector base 684. As shown in FIG. 6C, when the connector 682 and base 684 are put into the end holes 624 of a first and second ruler section, the retaining element 690 can be threaded onto the connector base and the retaining lips of the connector 682 and the retaining element 690 retain the connector assembly to connect the ruler sections. The connector base and retaining element can be separated by unthreading the two components and put back together by threading them together. To assist in the threading and unthreading, keys and key holes, such as the socket holes shown may be included in both elements.

Further, as shown in FIG. 6C, the protrusion 687 along the outside surface of the connector base 684 engages a ratchet pin 698 on the first ruler section 620*a* and engages a locking pin 699 on the second ruler section 620*b*. The locking pin 699 secures the connector rotationally in the second ruler section 620*b*. The ratchet pin 698 frictionally engages the protrusions 687 and creates a resistance to the connector head pivoting. The ratchet pin 698 is resilient and still allows pivot of the connector head if sufficient force is applied.

Figure 7A:
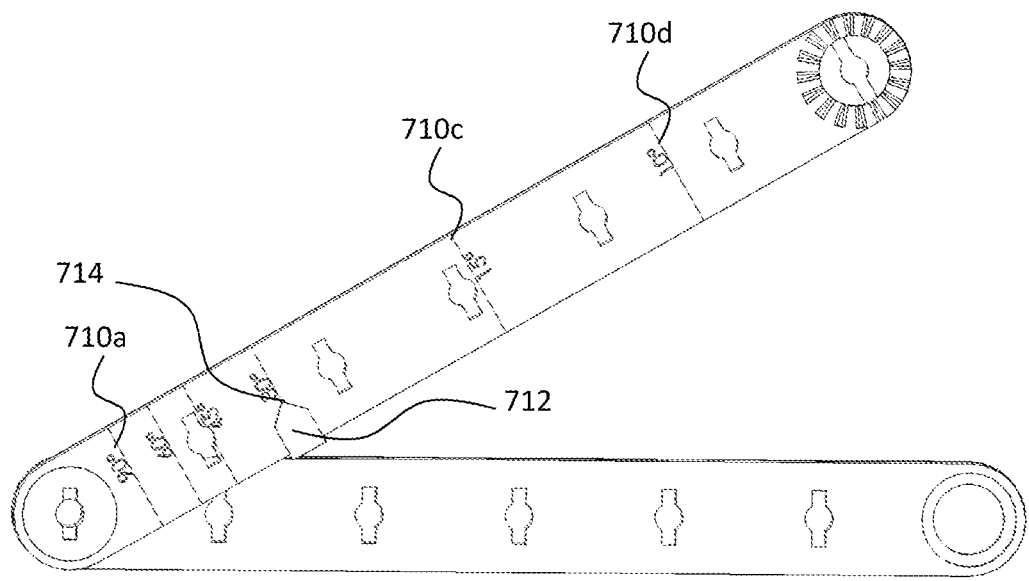
FIG. 7A illustrates a top view of one embodiment of the measuring assembly showing an angle measuring system with an angle slide.

In another embodiment of the segmented measuring assembly shown in FIG. 7A, the assembly further includes an angle measurement system as a means to determine the angle of edges of the ruler sections. As shown, one embodiment of the angle measurement system comprises an aligning element that aligns with predetermined angle markings such as 710*a*, 710*c* and 710*d*, on one of the ruler sections. Angle markings 710*a*, 710*c* and 710*d* are examples of markings at 90, 15 and 10 degrees respectively. As shown, one embodiment of the aligning element is an the angle slide 712 wraps around a portion of one of the ruler sections and has an angle pointer element 714 that is able to move up and down a portion of the length of the ruler section. The predetermined angle markings 710*a*, 710*c* and 710*d* correspond to points where, when the angle slide is at the point where the overlap of the inside edges of the ruler sections starts, the angle pointer element aligns with a marking that identifies the angle of the edges of the section. Although not necessary, the slide can impede the overlap of the ruler sections to more clearly identify and hold the ruler sections at the angle.

Figure 7B:
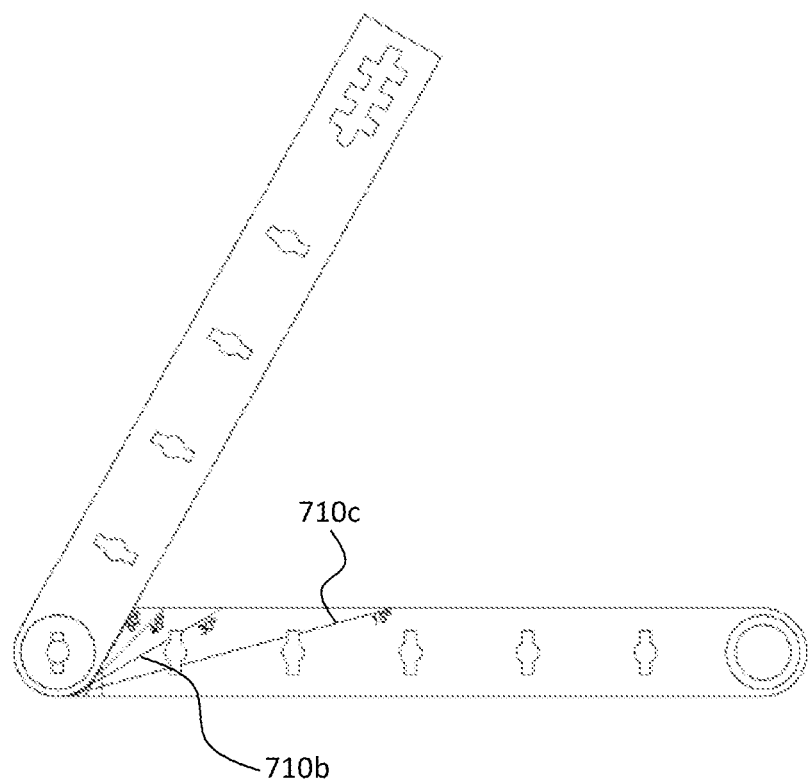
FIG. 7B illustrate a top perspective view of one embodiment of the measuring assembly showing one embodiment of an angle measuring system having angle markings to align with the ruler section edge.

In another embodiment of the segmented measuring assembly shown in FIG. 7B, the angle measurement system comprises angle markings, for example 710*b* and 710*c*, on one ruler section that align with the inside edge of the other ruler section, as an aligning element, at points corresponding to the angles, here 30 and 15 degrees respectively, of the edges and key hole centers of the ruler sections. This angle measurement system is generally placed at the end of the ruler section proximal to the pivot connection and derives the angle from the edge of the ruler near the pivot area. Multiple angle markings can be made to signify multiple predetermined angles.

Another embodiment of the angle measurement system comprises using markings on either ruler section to align with markings on the other ruler section at points that represent a predetermined angle of the outside edges.

As can be seen in the illustrations of FIGS. 7A and 7B, the configuration of the measuring assembly, provides helpful features when used with inside corners. As can be seen, when the measuring assembly is placed on an inside corner, the lack of overlap at the section ends allows the assembly to nest into the corner. And when using this assembly to mark a surface in the corner, such as for an inside miter cut for a corner, the presence of the through holes and key holes in the center of the assembly, allow the surface to be marked as it should be cut by marking the surface through the key holes and through hole.

As shown in the embodiments of FIG. 8A-8C, the measuring assembly can be marked with measurement markings to include angle markings 810 and multiple length indicating markings 811 similar to the scales on a ruler. In some embodiments, the assembly will have a set of measurement markings on one side for various trades and there will also be special increments associated with that particular trade on the other side of the ruler (e.g. masons ruler-inch measurements on front and brick spacing on back). It is understood that although example embodiments have been described for marking, incrementing through holes and dimensioning other assembly elements in the US inch/foot scales, other scales such as metric scales or other trade specific scales may be used. And although the example embodiments shown in FIG. 8C shows the angle markings between the starting section and an intermediate section, it is understood that any two sections, or multiple sections may be used with angle markings to define angles between sections. In one embodiment, the end section and the connected intermediate section are used to define angles.

Figure 9A:
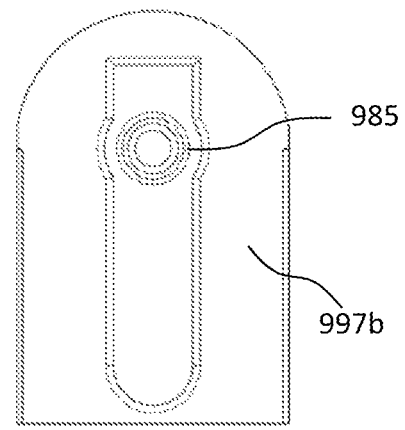
FIG. 9A illustrates a top view of one embodiment of a connector.
Figure 9B:
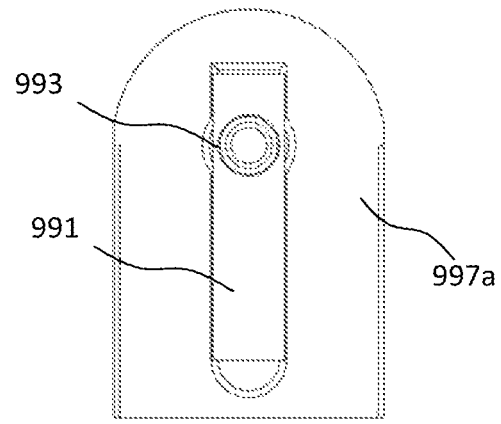
FIG. 9B illustrates a bottom view of the embodiment of the connector in FIG. 9A.
Figure 9C:
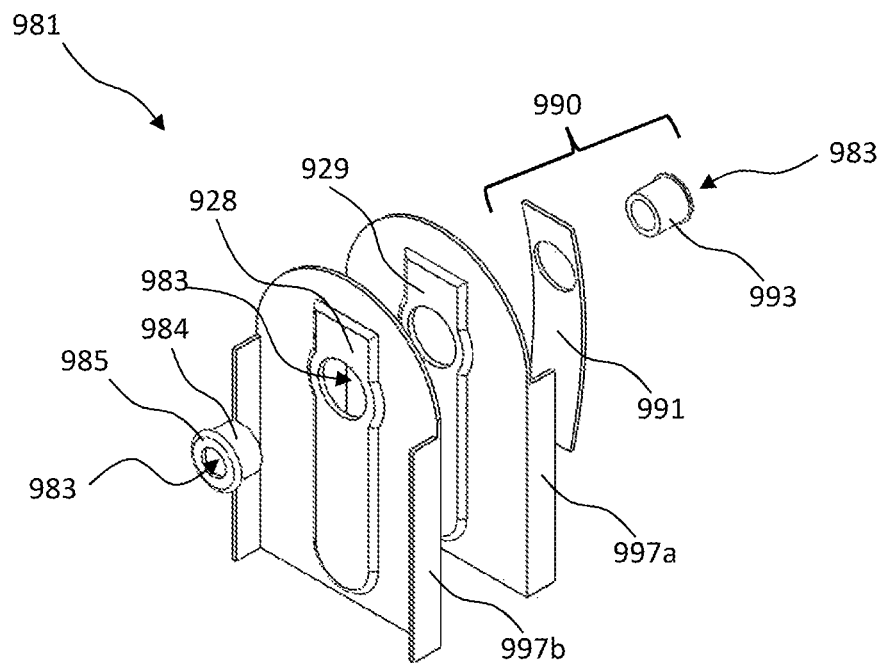
FIG. 9C illustrates an exploded view of the connector in FIGS. 9A and 9B.

In another embodiment of the pivot connection system, FIGS. 9A-9C shows another embodiment of the pivot connector assembly. In this embodiment connection assembly comprises a connector head 985, a connector base 984, a retaining element 990 and two inside joint plates 997*a* and 997*b*. The retaining element 990 is an elongated resilient spring plate 991 and rivet 993. The spring plate 991 is attached to the connector head 995 and base 984 by the rivet 993. The inside joint plates 997a and 997b fit on the inside joint surfaces of the ruler sections and provide an elongated protrusion 929 and mating recesses (under bump 928) that biases the connector assembly in predetermined configurations as the ruler section pivot about each other. This connector assembly has a round connector hole extending through its thickness.

Figure 10:
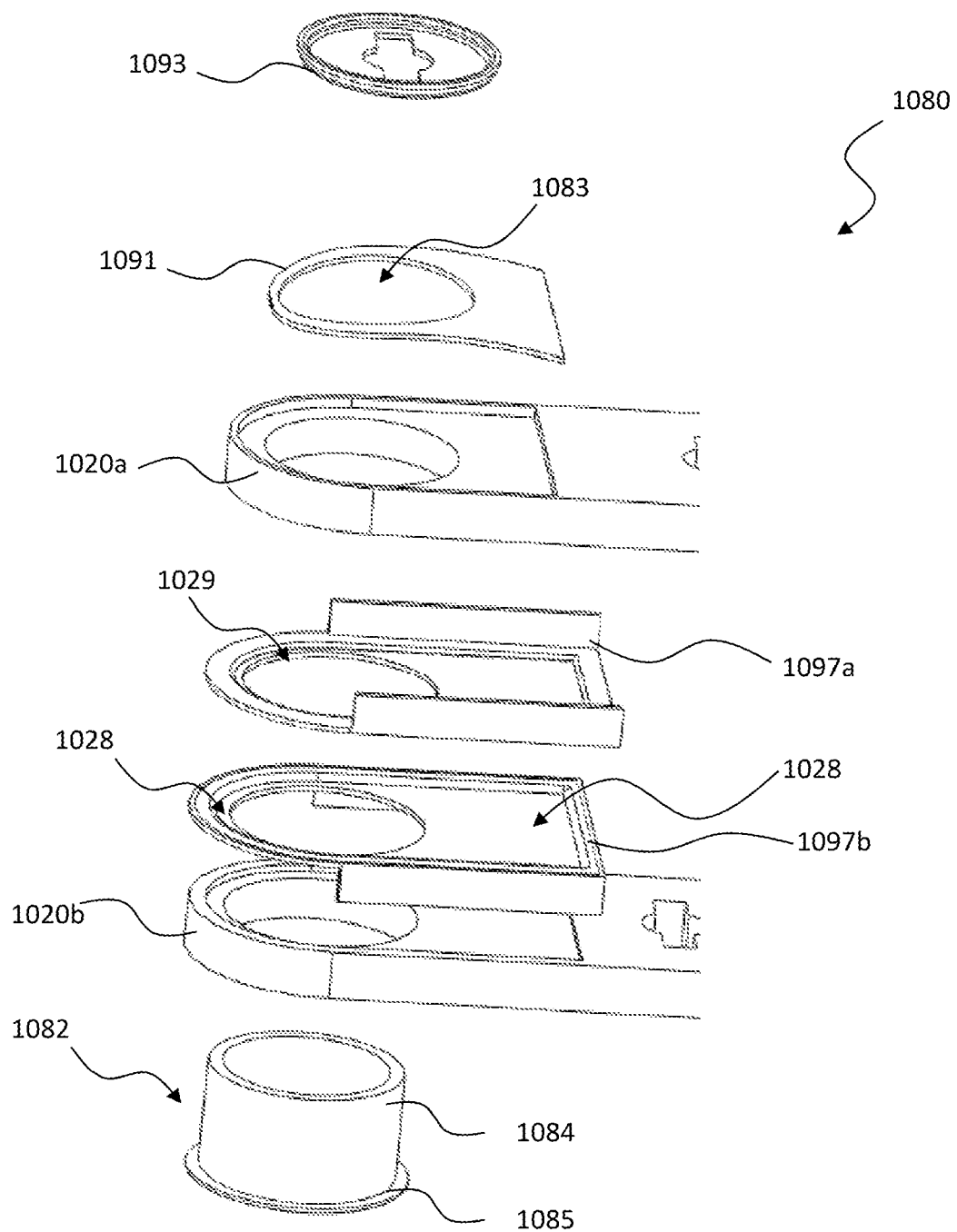
FIG. 10 illustrates an exploded view of another pivot connection system.

In another embodiment of the pivot connection system, FIG. 10A shows an exploded view of a connection assembly with a through hole 1083 extending through the connection assembly to a key hole on one end of the assembly. In this embodiment, the connection assembly comprises a connector 1082, a retaining element 1090 and two inside joint plates 1097a and 1097b. The connector comprises a connector head 1085 and a connector base 1084 and the retaining element comprises a resilient spring plate 1091 and a large rivet 1093. The rivet is attached the connector base 1084. The inside joint plates fit on the inside joint surfaces of the ruler sections 1020a and 1020b and provide an elongated protrusion 1029 and recesses 1028 that biases the connection assembly and system in predetermined configurations as the sections and plates pivot about the joint. The spring plate 1091 is biased to be convex such that it provides a resilient connection allowing the connection assembly to expand as the sections pivot and compress when the protrusion and recess align in a mating position. The retaining surface of the ruler section 1020 has a recess that allows the spring plate 1091 to sit flush when the connection system is installed and also allows some movement of the spring plate to provide resiliency to the assembly as it pivots.

In another embodiment of the segmented measuring assembly, the assembly further includes removable tips at the scribe tip end of the starting section that allow different configurations of scribe tips to be added and removed.

One Embodiment of the Segmented Measuring Assembly in Operation:

For purposes of illustrating the operation of one embodiment of a segmented measuring assembly, and not for limitation, the operation of a segmented measuring assembly for different possible applications is discussed. To help illustrate these examples, an embodiment of a segmented measuring assembly comprising ruler sections having through holes at every inch of the assembly, except for at the scribing tip of the starting ruler section which has a scribing tip as described above with the ability to identify 1/16th of an inch details. The measuring assembly in this example has markings like a ruler with markings on at least one edge as detailed as 1/16th of an inch.

One embodiment of a segmented measuring assembly may be used for the masonry application of measuring and marking a miter cut for a 90 degree inside corner. As designed, ruler sections of the measuring assembly are extended as needed from the assembly in a collapsed position. The measuring assembly sections extend about the pivot connection on the ends of the ruler sections. For a miter cut measurement of a 90 degree inside corner, one of the pivot connections are placed on the inside corner with ruler sections extending along the inside corner walls. Using the angle measuring system, the angle of the inside corner can be confirmed. The angle measuring system can also be used to identify an angle of 45 degrees as ½ of the inside corner and one of the inside edges of the ruler section can be pivoted to 45 degrees. At this degree of pivot, the through holes of the pivoted section can be used to mark the surface under that ruler section to identify the miter cut. The measuring assembly can then be removed and one edge of the ruler sections can be used to scribe a line connecting the marks made through the through holes. With this method, the centerline of the through holes, and the resulting marks, extend into the origin of the 90 degree junction of the inside corner.

One embodiment of the measuring assembly can also be used to locate an arch or curve. For example, if it is desired to create a semicircle arch to span a distance of 32½ inches, the arch diameter for that span would be 32½ inches. The radius or the arch, to locate the center, would be ½ of the diameter or 16¼ inches. To scribe the arch with a radius of 16¼ inches, use the markings on the assembly to identify the location where the center of the arch and mark one point on the radius at 16¼ inches. Mark those locations on the work piece. Then, with the measuring assembly, align the key holes and the scribing tip such that the center mark can be seen through one key hole and the radius mark can be seen through a section of the scribing tip. This should align at the 17 inch mark through hole and the radius mark should align at the ¾ inch mark inside the scribing tip. With this aligned, the assembly can be secured by a nail or screw through the through hole and a pencil can be placed in the particular portion of the scribing tip so that the scribing tip and pencil can be rotated through an arch about the center and therefore mark the arch.

One embodiment of the measuring assembly can also be used to locate create a small curve. For this operation, the measuring assembly can be placed against the work piece. With the body of the assembly against the straight edge of the work piece held snug and then pivoting the ruler section about one of the connection assemblies to create one or multiple size curves. The stabilized section of the assembly acts as a square edge allowing the pivoting section to pivot and scribe at the scribing tip or any of the through holes.

One embodiment of the measuring assembly can also be used to replicate an interior wall angle. For this operation, the measuring assembly can be placed against the corner with one of the connector assemblies nested into the corner with sections of the assembly extending along each of the inside walls. The measuring assembly can then be taken from this corner and taken to a work piece to replicate the inside corner angle.

One embodiment of the measuring assembly can also be used to quickly measure the increments of the through holes. Using the flange tip end of the assembly, the tip can be hooked onto the edge of a work piece and increments can be marked using the through holes of the assembly sections.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although this invention has been described in the above forms with a certain degree of particularity, it is understood that the present disclosure has been made only by way of example and numerous changes in the details of construction and combination and arrangement of parts may be resorted to without departing from the spirit and scope of the invention.

I claim:

1. A segmented measuring assembly, said segmented measuring assembly comprising:
a first and second ruler section;
each ruler section having a section length, a section width and a section thickness;
each ruler section further comprising a section proximal end, a section distal end and a plurality of section through holes extending through the section thickness along the section length;
a pivot connection system connecting the distal end of the first ruler section and the proximal end of the second ruler section whereby the second ruler section can pivot in relation to the first ruler section about the pivot connection system;
the pivot connection system defining a connector hole when the distal end of the first ruler section and the proximal end of the second ruler section are connected;
a scribe tip proximal to one of the distal end of the second section or the proximal end of the first section;
the scribe tip comprising an offset key slot design extending through the section thickness;
the offset slot design has one side with multiple ⅛th inch slots dimensioned starting from a 1/16th inch mark from the distal end of the second section or the proximal end of the first section end extending to the 1 inch marking; and
the offset key slot design further comprises another side with multiple slots offset 1/16th inch from each of the key slots on the other side of the offset key slot design.

2. The measuring assembly of claim 1 wherein:
each ruler section further comprises markings at about 1 inch increments about each section length;
the through holes comprise an elongated channel extending perpendicular to the length of the ruler section and extending through the section thickness; and
the elongated channel further comprises a rounded portion with a radial center positioned at a point about ⅜ of an inch from an edge of the ruler section.

3. The measuring assembly of claim 1 wherein proximal end of the second ruler section and the distal end of the first ruler section are each curved ends whereby there is no overhang of the curved ends when the ruler sections pivot in relation to each other.

4. The measuring assembly of claim 1 wherein the pivot connection system comprises:
a disc shaped head configured to engage a first retaining surface on the first ruler section whereby the head is retained relative to the first ruler section;
a connector hole extending through a head thickness;
at least one prong extending from a bottom of the head;
a first end hole through the first ruler section thickness to receive the at least one prong;
a second end hole through the second ruler section thickness to receive the at least one prong; and
a retaining pin configured to engage the at least one prong and a second retaining surface on the second ruler section whereby the head is retained relative to the second ruler section.

5. The measuring assembly of claim 1 further comprising:
a disc shaped head configured to engage a first retaining surface on the first ruler section whereby the head is retained relative to the first ruler section;
a connector hole extending through a head thickness;
at least one prong extending from a bottom of the head;
a first through hole through the first ruler section thickness to receive the at least one prong;
a second through hole through the second ruler section thickness to receive the at least one prong;
the head having circumferential protrusions; and
a ratchet pin engaging the circumferential protrusions whereby the ratchet pin resists pivot of the first ruler section relative to the second ruler section.

6. The measuring assembly of claim 1 wherein:
the first and second ruler sections each having inside joint surfaces;
the inside joint surface of one of the first or second ruler sections has protrusions located radially about the first through hole; and
the other inside joint surface of the first or second ruler section has mating recesses located radially about the second through hole whereby the protrusions engage the recesses as the first ruler section pivots relative to the second ruler section.

7. The measuring assembly of claim 6 wherein:
the protrusions engage the recesses resiliently at predetermined stop points;
the predetermined stop points defining an angle between a first edge of the first ruler section and a second edge of the second ruler section; and
the predetermined stop points are configured to define angles between about 0 and 360 degrees at increments not to exceed about 91 degrees.

8. The pivot connection system of claim 1 wherein:
the first and second ruler section ends each having an inside edge and an outside edge;
one of the first and second ruler sections ends having predetermined angle markings corresponding to an angle between the outside edges of the first and second ruler sections; and
an aligning element of one of the first and second ruler sections to align with the angle markings on the other ruler section whereby the markings identify the angle between the outside edges of the ruler sections.

9. The measuring assembly of claim 1 wherein the proximal end of the first section further comprises a scribing through hole extending through the section thickness.

10. The measuring assembly of claim 1 wherein:
the first ruler section is a starting ruler section;
the second ruler section is an intermediate ruler section;
the measuring assembly further comprises a plurality of intermediate ruler sections and a third ruler section as an end ruler section;
the starting ruler section is pivotally connected to one of the plurality of intermediate ruler sections;
the plurality of intermediate section are further pivotally connected together; and
the end ruler section is pivotally connected to one of the plurality of intermediate ruler sections whereby the measuring assembly is movable between a collapsed configuration and an extended configuration.

11. The measuring assembly of claim 1 wherein the scribe tip is a removable scribe tip.

12. The measuring assembly of claim 1 wherein:
the pivot connection system comprises;
a threaded connector; and
a threaded retaining element whereby the threaded connector and the threaded retaining element mate and removably connect the distal end of the first ruler section and the proximal end of the second ruler section.

13. The measuring assembly of claim 1 further comprising a ratchet whereby the pivot connection system provides a variable resistance to the pivoting of the second ruler section can pivot in relation to the first ruler section.

14. The measuring assembly of claim 1 wherein the pivot connection system further comprises a connector having the connector hole and the connector hole extending through the connector whereby a tool may be received through the connector hole.

15. A pivot connection system for a segmented measuring assembly, said pivot connection system comprising:
a first ruler section end having a first end hole and a first retaining surface;
a second ruler section end having a second end hole and a second retaining surface;
a connector assembly comprising a connector and a retaining element;
the connector having a connector head and a connector base and a connector hole extending through the connector;
the connector head shaped to engage the first retaining surface;
the connector base shaped to extend through the first retaining surface and the second retaining surface;
the retaining element configured to engage the connector base and the second retaining surface whereby the connector pivotally connects the first ruler section and the second ruler section;
the connector base further comprising at least one prong extending from a bottom of the connector head;
the prong having a prong through hole;
the retaining element is an elongated resilient retaining pin shaped to be received in the prong through hole and shaped to engage the second retaining surface;
the retaining pin has a proximal end and a distal end; and
the second retaining surface is an uneven surface supporting the proximal end and distal end of the retaining pin and defining a gap between a middle portion of the second retaining surface and a middle portion of the retaining pin when the pivot connection system is at rest.

16. The pivot connection system of claim 15 wherein:
the first ruler section end further having a first inside joint surface;
the second ruler section end having a second inside joint surface;
the first inside joint surface having a first uneven surface portion located radially about the first end hole; and
the second inside joint surface having a second uneven surface portion located radially about the second end hole whereby the first uneven surface engages the second uneven surface as the first ruler section pivots relative to the second ruler section.

17. The pivot connection system of claim 16 wherein:
the first uneven surface engages the second uneven surface resiliently at predetermined stop points;
the predetermined stop points defining an angle between a first edge of the first ruler section and a second edge of the second ruler section; and
the predetermined stop points are configured to define angles between about 0 and 360 degrees at increments not to exceed about 91 degrees.

18. The pivot connection system of claim 17 wherein the predetermine stop points are configured to define angles between about 0 and 360 degrees at increments not to exceed about 46 degrees.

19. The pivot connection system of claim 15 wherein:
the connector head having a circumferential surface;
the circumferential surface having a plurality of protrusions extending from the circumferential surface and a plurality of recessed points recessed relative to the protrusions; and
a ratchet pin engaging the protrusions on the circumferential surface whereby the ratchet pin resists the pivot of the first ruler section relative to the second ruler section.

20. The pivot connection system of claim 15 wherein:
the first end hole having a first center and the center having a first centerline distance to a first ruler section end edge;
the first ruler section end having a curved shape defined by a curve radius not to exceed the first centerline distance;
the second end hole having a second center and the center having a second centerline distance to a second ruler section end edge; and
the second ruler section end having a curved shape defined by a curve radius not to exceed the second centerline distance whereby the ruler section end edges do not extend beyond each other when the first ruler section pivots relative to the second ruler section.

21. An angle measurement system for a segmented measuring assembly, said system comprising:
a first and second ruler section;
each ruler section having a section length, a section width an inside edge and an outside edge;
one of the first and second ruler sections having angle markings corresponding to an angle between the outside edges of the first and second ruler sections when the angle is less than about 90 degrees;
an aligning element of one of the first and second ruler sections;
the aligning element comprises an angle slide slidably engaged with the first ruler section;
the angle slide is configured to slidably obstruct an overlap of the inside edges of the first and second ruler sections; and
the angle slide having a pointer element configured to align with the markings on the first ruler section whereby the markings identify the angle between the outside edges of the ruler sections.

* * * * *